(12) United States Patent
Kruger et al.

(10) Patent No.: US 6,862,798 B2
(45) Date of Patent: Mar. 8, 2005

(54) METHOD OF MAKING A NARROW POLE TIP BY ION BEAM DEPOSITION

(75) Inventors: James Bernard Kruger, Half Moon Bay, CA (US); Benjamin Lu chen Wang, San Jose, CA (US); Patrick Rush Webb, San Jose, CA (US); Howard Gordon Zolla, San Jose, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 371 days.

(21) Appl. No.: 10/054,621

(22) Filed: Jan. 18, 2002

(65) Prior Publication Data

US 2003/0135987 A1 Jul. 24, 2003

(51) Int. Cl.[7] .................... G11B 5/127; H04R 31/00
(52) U.S. Cl. .................... 29/603.13; 29/603.07; 29/603.15; 29/603.16; 29/603.18; 204/192.15; 205/119; 205/122; 216/39; 216/41; 306/122; 306/126; 306/317; 427/127; 427/128
(58) Field of Search .................... 29/603.07, 603.13, 29/603.15, 603.16, 603.18; 204/192.15; 216/39, 41, 62, 63, 66; 360/122, 126, 317; 427/127, 128; 205/119, 122

(56) References Cited

U.S. PATENT DOCUMENTS

| | | | |
|---|---|---|---|
| 4,502,914 A | 3/1985 | Trumpp et al. ............. 156/643 |
| 4,648,937 A | 3/1987 | Ogura et al. ............... 156/643 |
| 4,803,181 A | 2/1989 | Buchmann et al. ......... 437/228 |
| 5,327,638 A | 7/1994 | Haines et al. ................. 29/603 |
| 5,491,600 A | * 2/1996 | Chen et al. ................. 360/322 |
| 5,710,510 A | 1/1998 | Seagle et al. ............... 324/210 |
| 5,795,830 A | 8/1998 | Cronin et al. ............... 438/696 |
| 5,920,979 A | 7/1999 | Nepela et al. ............ 29/603.13 |
| 5,966,800 A | 10/1999 | Huai et al. ................ 29/603.13 |
| 6,043,960 A | 3/2000 | Chang et al. ............... 360/126 |
| 6,054,023 A | 4/2000 | Chang et al. ............. 204/192.2 |
| 6,101,068 A | 8/2000 | Ohtomo et al. ............ 360/126 |
| 6,183,938 B1 | 2/2001 | Lyons et al. ................. 430/313 |
| 6,194,268 B1 | 2/2001 | Furukawa et al. .......... 438/257 |
| 6,214,737 B1 | 4/2001 | Lyons et al. ................. 438/706 |
| 6,226,149 B1 * | 5/2001 | Dill et al. .................... 360/126 |
| 6,301,084 B1 * | 10/2001 | Santini ....................... 360/317 |
| 6,377,423 B2 * | 4/2002 | Dill et al. .................... 360/126 |

FOREIGN PATENT DOCUMENTS

JP   04356728 A  * 12/1992 ............ G11B/5/85

OTHER PUBLICATIONS

"Highly defined narrow track write heads fabricated by focused ion beam trimming with the Al2O3 refilling process"; Ishi, T.; Nonaka, Y.; Matsubara, T.; Ishiwata, N.; Magnetics, vol.: 35 , Issue: 5 , Sept. 1999; pp. 2541–2543.*
U.S. Appl. No. 09/944,648, filed Aug. 31, 2001.

* cited by examiner

Primary Examiner—Paul D Kim
(74) Attorney, Agent, or Firm—Ervin F. Johnston (57) ABSTRACT

A method of making a magnetic head assembly wherein the magnetic head assembly has a write head with a pole tip includes the steps of forming a shaping layer on an underlying layer wherein the shaping layer has a side surface and a top surface, ion beam sputter depositing a ferromagnetic material layer on the underlying layer and on the side and top surfaces of the shaping layer and removing first and second portions of the ferromagnetic material layer from the underlying layer and the top surface of the shaping layer, respectively, leaving a remaining portion of the ferromagnetic material layer on the side surface of the shaping layer which is the aforementioned pole tip.

38 Claims, 7 Drawing Sheets

METHOD OF MAKING A NARROW POLE TIP BY ION BEAM DEPOSITION

BACKGROUND OF THE INVENTION

1. Field of the Invention

The present invention relates to a method of making a narrow pole tip by ion beam deposition and, more particularly, to such a method wherein a forming layer provides a side wall where pole tip material is ion beam deposited.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

A write head typically employs ferromagnetic first and second pole pieces which are capable of carrying flux signals for the purpose of writing the magnetic impressions into the track. Each of the first and second pole pieces has a pole tip, a yoke and a back gap with the yoke being located between the pole tip and the back gap. The pole tips are located at the ABS and the back gaps are magnetically connected at a recessed location within the write head. At least one coil layer is embedded in an insulation stack between the yokes of the first and second pole pieces. A nonmagnetic write gap layer is located between the pole tips. Processing circuitry digitally energizes the write coil which induces flux signals into the first and second pole pieces. The flux signals bridge across the write gap layer at the ABS so as to write the aforementioned magnetic impressions or bits into the track of the rotating disk. The thinner the thickness of the write gap layer, the greater the number of bits the write head can write into the track.

A write head is typically rated by its real density which is a product of its linear bit density and its track width density. The linear bit density, which is dependent on the thickness of the write gap layer and the data rate of the write head, is the number of bits which can be written per linear inch along the track of the rotating magnetic disk and the track width density, which is dependent on the track width of the write head, is the number of tracks that can be written per inch along a radius of the rotating magnetic disk. The linear bit density is quantified as bits per inch (BPI) and the track width density is quantified as tracks per inch (TPI). The width of the last pole tip to pass along a track of a rotating magnetic disk determines the track width density. The more narrow the pole tip the higher the tracks per inch (TPI). Efforts over the years to increase the real density of write heads have resulted in computer storage capacities which have increased from kilobytes to megabytes to gigabytes.

The first and second pole pieces are typically fabricated by frame plating. Photoresist is employed to provide the frame and a seed layer is employed to provide a return path for the plating operation. A typical sequence for fabricating a pole piece is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist and then plate the pole piece in the opening up to a desired height.

The last pole tip to pass the aforementioned track on the rotating disk is typically the second pole tip (P2T) which is magnetically connected to the second pole piece. A typical method of making the second pole tip is to frame plate the second pole piece and its second pole tip as one layer. Unfortunately, this has resulted in a second pole tip with irregularly shaped first and second side walls due to pole tip notching. Pole tip notching is caused by light reflected from a high profile of the insulation stack into the pole tip region. In order to overcome this problem the second pole tip has been fabricated by a frame plating process followed by fabricating the remainder of the second pole piece with a second frame plating process. Even in this method the smoothness of the first and second side walls of the second pole tip depends upon the thickness of the photoresist employed to provide the frame for plating. When the opening in the frame is narrow in order to construct a narrow pole tip the resist frame must be high in order to permit sufficient pole material to be deposited so as to provide sufficient ferromagnetic material to carry the flux that writes the magnetic bits into the rotating magnetic disk. When the photoresist frame is thick the light exposure step loses a considerable amount of resolution before the light reaches the bottom of the photoresist layer. Accordingly, the width of the second pole tip is limited by this process. When the last pole tip to pass the rotating magnetic disk is the pole tip (P1T) of the first pole piece, the first pole piece and the first pole tip are also made with a single frame plating process. The problem with obtaining a narrow first pole tip is the same as that addressed hereinabove in obtaining a narrow second pole tip with a single frame plating process.

SUMMARY OF THE INVENTION

The present invention overcomes the aforementioned problems by providing a method of making a high resolution ultra-narrow pole tip. The method includes forming a shaping layer on an underlying layer wherein the shaping layer has a side surface and a top surface. The underlying layer may either be a write gap layer when a second pole tip is being fabricated or a first pole piece layer when a first pole tip is being fabricated. In a preferred embodiment a ferromagnetic material layer is ion beam sputtered on the underlying layer and on the side and top surfaces of the shaping layer at an angle to a normal to the underlying layer. First and second portions of the ferromagnetic material layer are then removed from the underlying layer and the top surface of the shaping layer leaving a remaining portion of the ferromagnetic material layer on the side surface of the shaping layer. The shaping layer may then be removed leaving the remaining portion of the ferromagnetic material layer as the desired pole tip. In one aspect of the invention a method of forming the shaping layer includes the steps of forming a photoresist layer on the underlying layer with the aforementioned side surface and a height which equals the desired height of the pole tip. In another aspect of the invention the method of making the shaping layer includes the steps of forming a first photoresist layer on the underlying layer with a thickness, forming a hard mask layer on the first photoresist layer, forming a second photoresist layer on the hard mask layer with a thickness that is less than the thickness of the first photoresist layer, forming the second photoresist layer with an edge which coincides with an edge site of the desired pole tip, reactive ion etching the hard mask layer and the first photoresist layer with the aforementioned side surface for forming an edge of the desired pole tip and then removing the second photoresist layer. With this arrangement the combined thicknesses of the first photoresist layer and the masking layer equal the height of the desired pole tip.

An object of the present invention is to provide a method for making a high resolution ultra-narrow pole tip of a write head.

Another object is to provide a method of making a narrow pole tip of a write head by ion beam deposition.

A further object is to provide a narrow pole tip made by the aforementioned methods.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
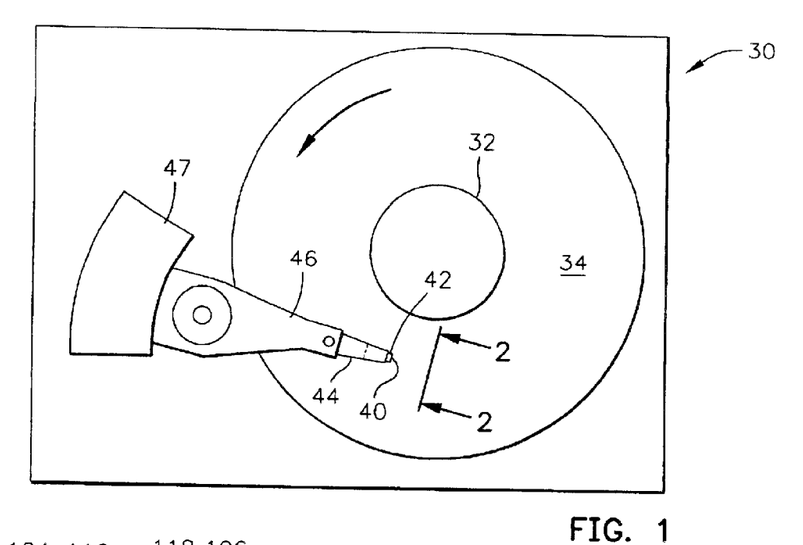
FIG. 1 is a plan view of an exemplary prior art magnetic disk drive.
Figure 2:
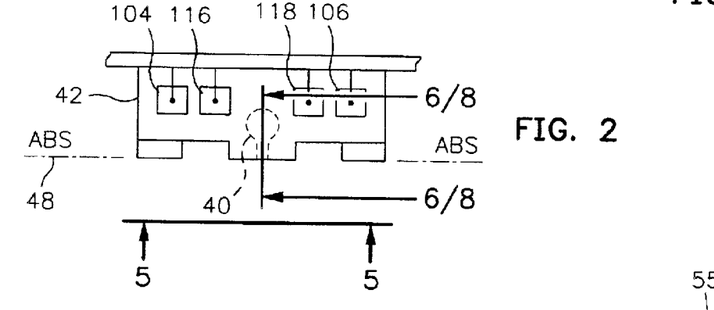
FIG. 2 is an end view of a prior art slider with a magnetic head of the disk drive as seen in plane 2—2 of FIG. 1.
Figure 3:
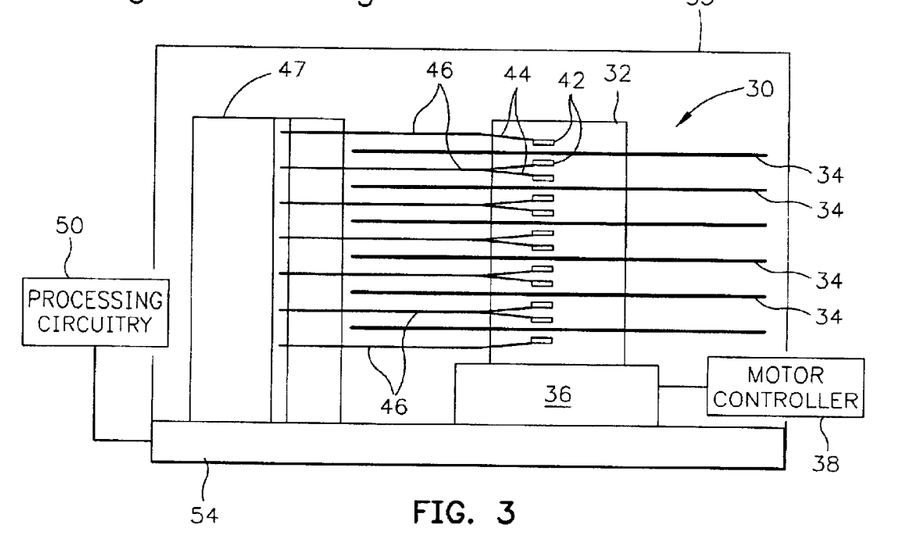
FIG. 3 is an elevation view of the prior art magnetic disk drive wherein multiple disks and magnetic heads are employed.
Figure 4:
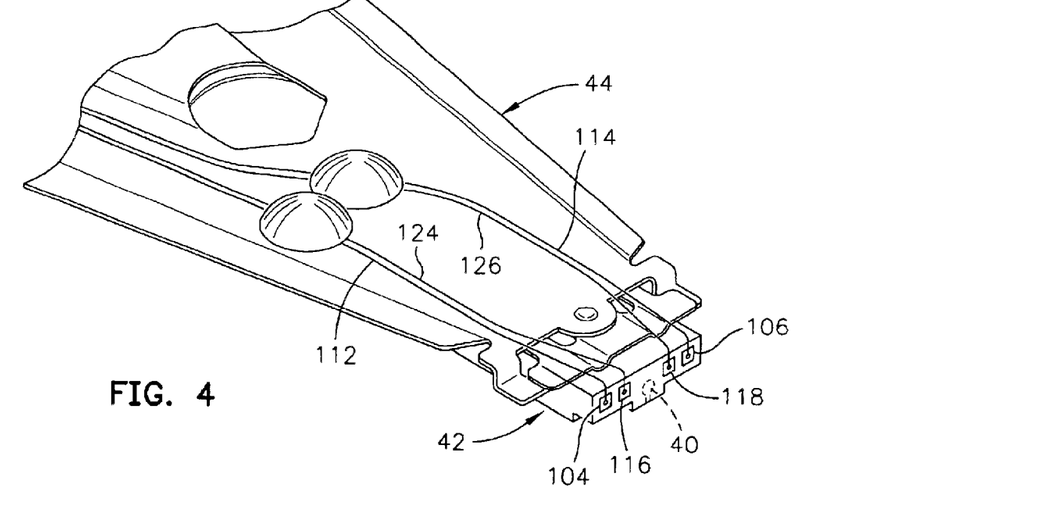
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
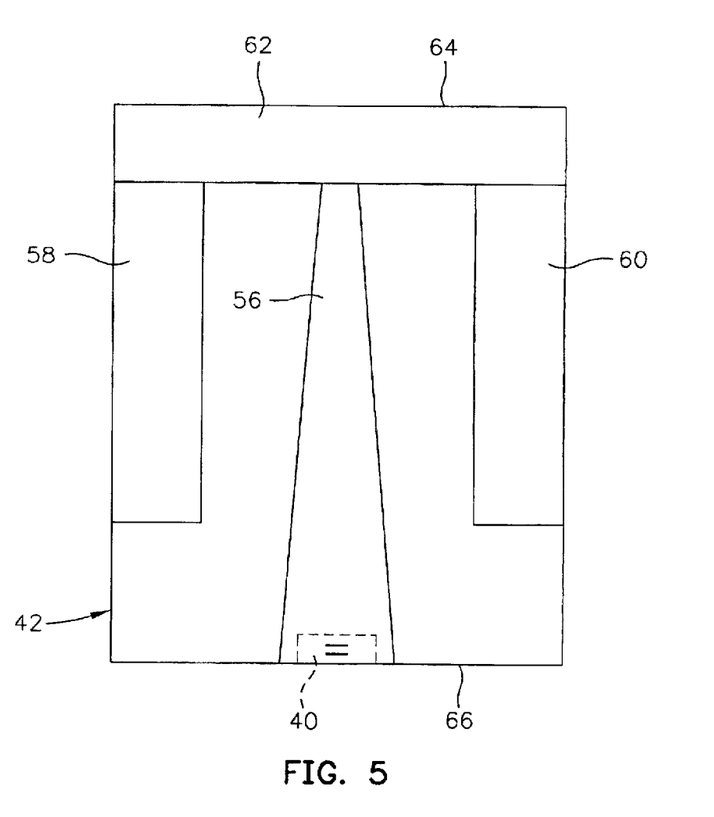
FIG. 5 is an ABS view of the magnetic head taken along plane 5—5 of FIG. 2.

FIG. 5 is an ABS view of the slider 42 and the magnetic head 40. The slider, which is exemplary, has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
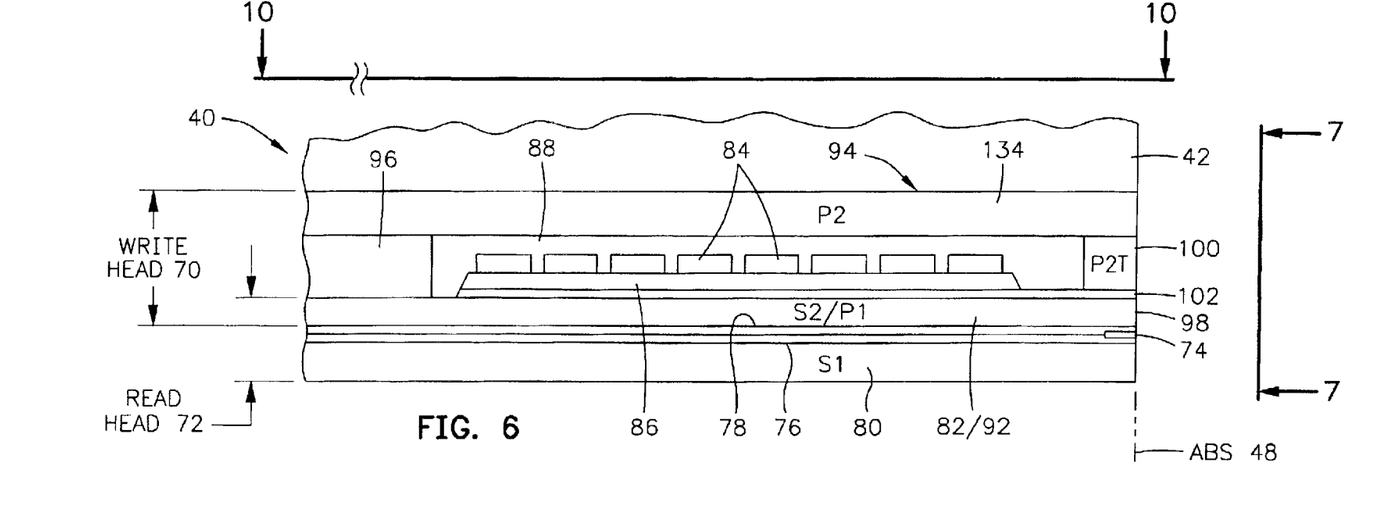
FIG. 6 is a partial view of one embodiment of the slider and the present write head as seen in plane 6—6 of FIG. 2.
Figure 7:
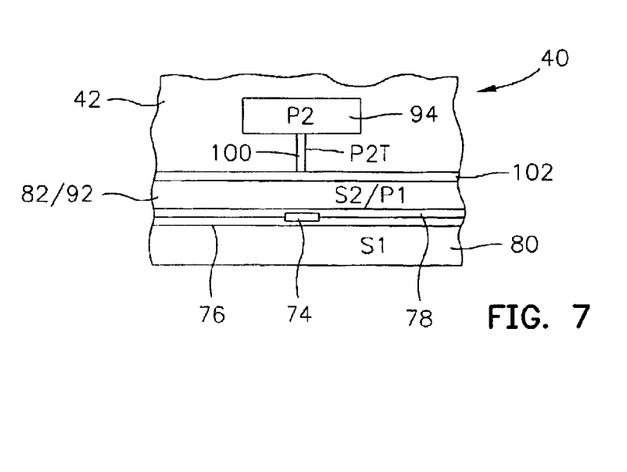
FIG. 7 is a partial ABS view of the slider taken along plane 7—7 of FIG. 6 to show the read and write elements of the magnetic head.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current conducted through the sensor causes these resistance changes to be manifested as potential changes which are processed as readback signals by the processing circuitry 50 shown in FIG. 3.

The write head portion 70 of the magnetic head 40 includes a coil layer 84 sandwiched between first and second insulation layers 86 and 88. The first and second insulation layers are referred to in the art as an "insulation stack". The coil layer 84 and the first and second insulation layers 86 and 88 are sandwiched between first and second pole piece layers (P1 and P2) 92 and 94. The first and second pole piece layers 92 and 94 are magnetically coupled by a back gap layer 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

In the magnetic head assembly 40 in FIG. 6 the last pole tip to pass on a track of a rotating magnetic disk is the second pole tip (P2T) 100. In the magnetic head assembly 40 in FIG. 8 the last pole tip to pass on the track of the rotating magnetic disk is the first pole tip (P1T) 104 which is part of the first pole piece. It can be seen from FIG. 8 that the magnetic head assembly 40 differs from the magnetic head assembly 40 in FIG. 6 in that the first pole tip (P1T) 104 interfaces and is magnetically connected to the first pole piece layer 92. The second insulation layer 88 may be planarized with respect to the first pole tip 104 and the gap layer 102 may be constructed flat thereon. On top of the write gap layer 102 is the second pole piece layer (P2) 94 which may also be flat.

Figure 8:
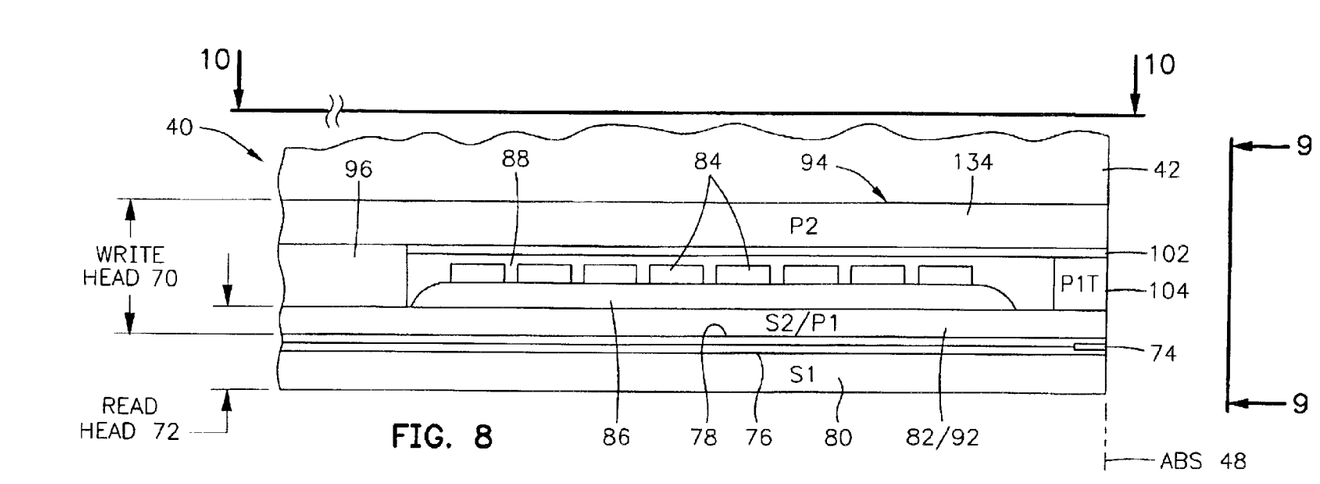
FIG. 8 is a partial view of a second embodiment of the slider of the present write head as seen in plane 8—8 of FIG. 2.
Figure 9:
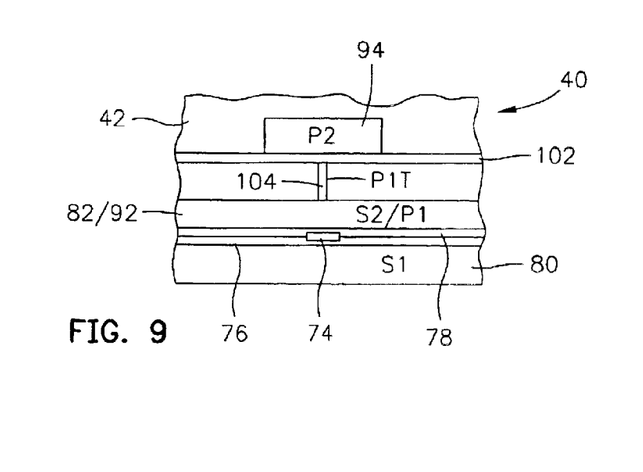
FIG. 9 is a partial ABS view of the slider taken along plane 9—9 of FIG. 8 to show the read and write elements of the magnetic head.
Figure 10:
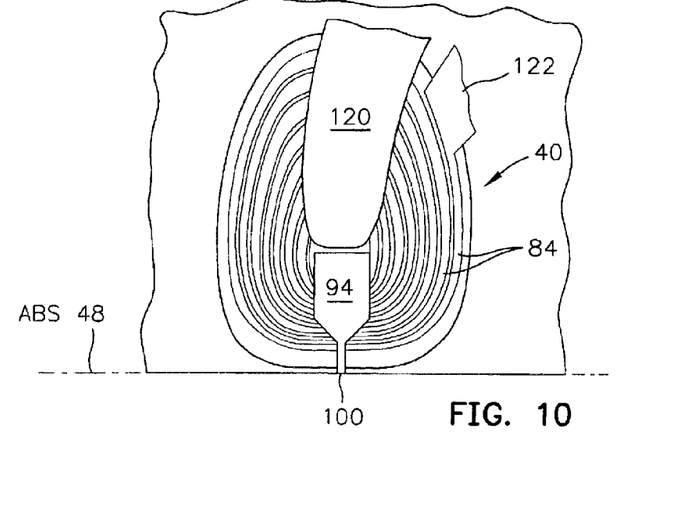
FIG. 10 is a view taken along plane 10—10 of FIG. 6 with all material above the coil layer and leads removed.

Either the second pole tip (P2T) 100 in FIG. 6 or the first pole tip (P1T) 104 in FIG. 8 are fabricated according to the method of the present invention. In FIG. 7, a forming layer (not shown), which is preferably photoresist, may or may not be adjacent the second pole tip (P2T) between the write gap layer 102 and the second pole piece layer 94. In FIG. 9 the forming layer may or may not be adjacent the first pole tip layer (P1T) 104. It can be seen from FIGS. 7 and 9 that the second pole tip layer (P2T) 100 and the first pole tip layer (P1T) 104 are extremely narrow in width with smooth first and second vertically oriented side walls.

Method of the Invention

Figure 11A:
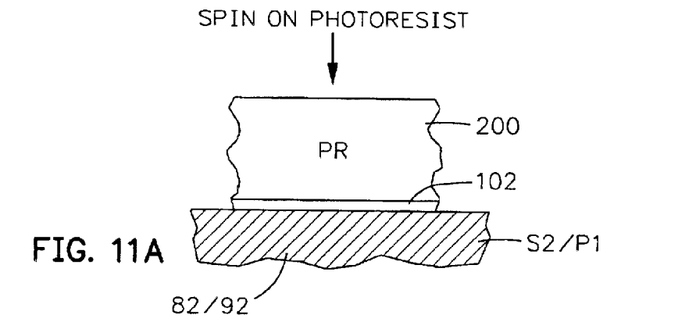
FIGS. 11A–11E illustrate a first method of making the present pole tip.
Figure 11B:
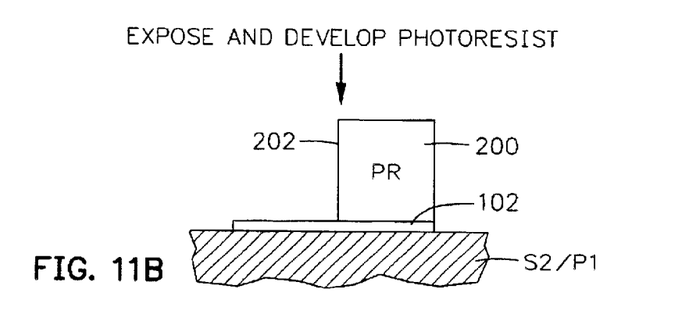
Figure 11C:
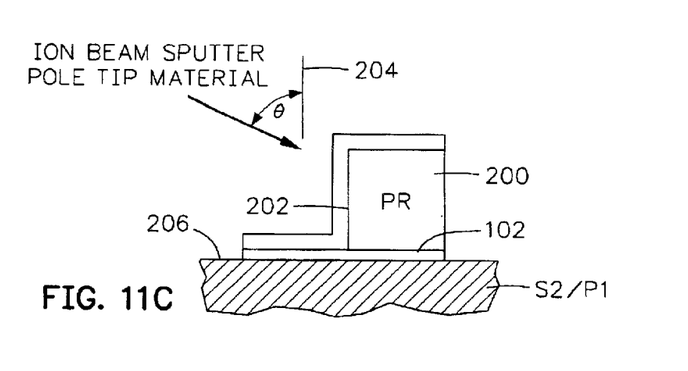
Figure 11D:
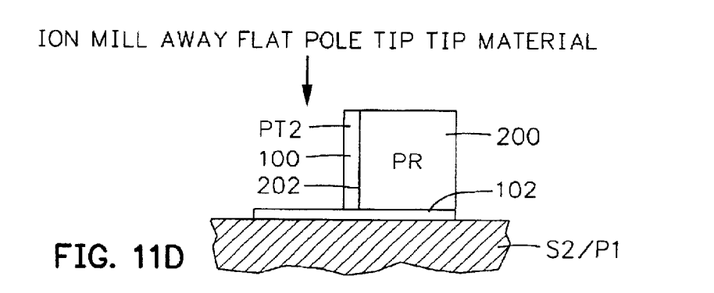

FIGS. 11A to 11E illustrate a sequence of steps as seen in an ABS view of a first method of making of the present invention. In this embodiment the underlying structure comprises the write gap layer 102 which is located on the second shield/first pole piece layer 82/92, as seen in FIGS. 6 and 7. In a first step a photoresist layer (PR) 200 is spun onto the write gap layer 102, as shown in FIG. 1A. In FIG. 11B the photoresist layer has been exposed to light and developed to form the photoresist layer with a vertical edge 202. In FIG. 11C pole tip material, such as nickel iron (NiFe), is ion beam sputtered on the top of the photoresist layer 200, the side 202 of the photoresist layer and the top of the write gap layer 102 at a maximum angle $\theta$ to a normal 204 to the major thin film surface 206 of the write gap layer. The angle $\theta$ can be in the order of 70°. In FIG. 11D the pole tip material on the top of the photoresist layer 200 and the pole tip material on top of the write gap layer has been ion milled away with the ion milling being parallel to a normal to the write gap layer. This leaves a vertical portion of the pole tip material adjacent the side 202 of the photoresist layer which forms the second pole tip (P2T) 100, as shown in FIGS. 6 and 7. It should be noted that the vertical ion milling in FIG. 11D mills away horizontal surfaces leaving vertical surfaces substantially untouched. If desired, the photoresist layer 200 may then be removed, as shown in FIG. 1E, leaving the second pole tip (P2T) 100 freestanding. The second insulation layer 88 in FIG. 6, which may be aluminum oxide ($Al_2O_3$), may then be sputter deposited and then planarized with the top of the second pole tip 100.

In construction of the first pole tip (P1T) 104, as shown in FIGS. 8 and 9, the sequence of steps is the same as the sequence of steps shown in FIGS. 11A–11E in the making of the first pole tip layer (P1T) except the underlying structure is the second shield/first pole piece layer (S2/P1) 82/92 without the write gap layer 102.

Figure 12A:
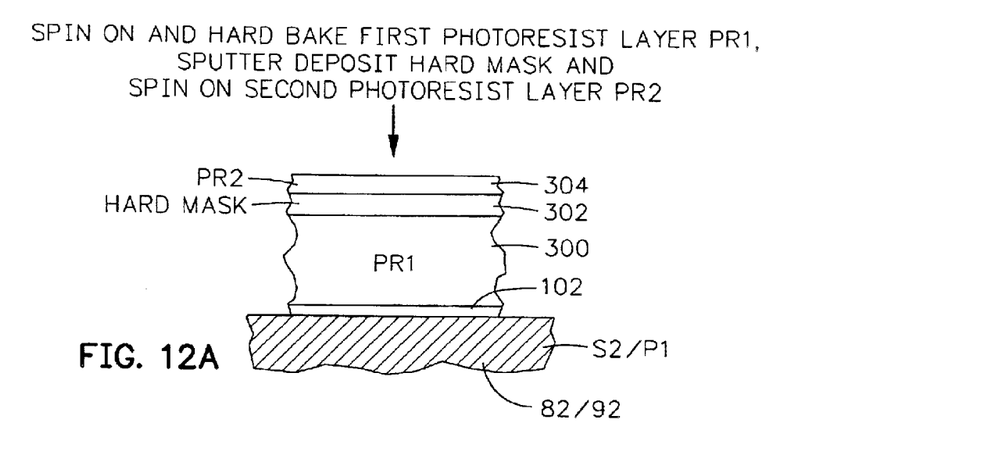
FIGS. 12A–12F show a second method of making the present pole tip.
Figure 12B:
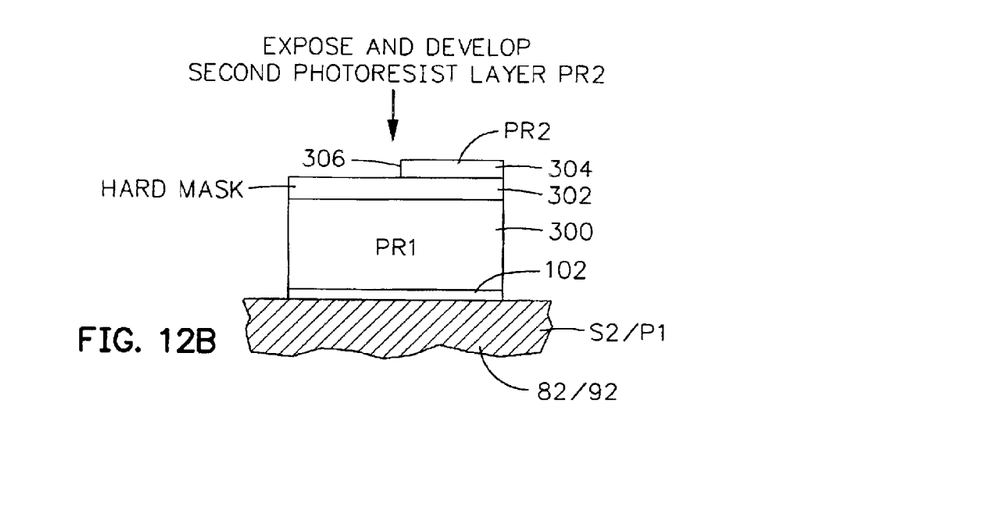
Figure 12C:
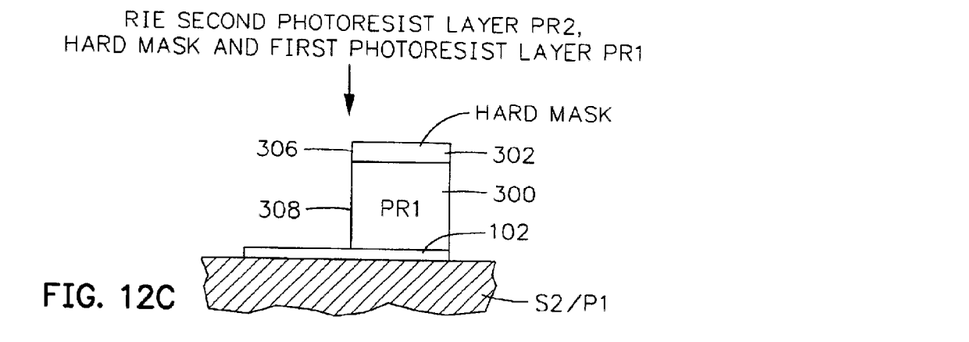

The sequence of steps for a second method of the present invention is illustrated in FIGS. 12A–12F. In this embodiment the same underlying structure comprising the write gap layer 102 on the second shield/first pole piece layer (S2/P1) 82/92 is shown in FIG. 12A. In FIG. 12A a first photoresist layer (PR1) 300 is spun on the write gap layer 102 and preferably hard baked. This is followed by sputter depositing a hard mask layer 302 on the first photoresist layer 300 and further followed by spinning a second photoresist layer (PR2) 304 on the hard mask layer 302. The hard mask layer 302 is preferably silicon dioxide ($SiO_2$), but may be selected from other materials such as tantalum oxide (TaO), silicon nitride (SiN), silicon oxynitride (SiON) and titanium oxide ($TiO_2$). It can be seen that the thickness of each of the hard mask layer 302 and the second photoresist layer 304 is considerably less than the thickness of the first photoresist layer 300. In FIG. 12B the second photoresist layer 304 is light exposed and developed to form a vertical edge 306 at an edge site for the second pole tip. In FIG. 12C the layers 304, 302 and 300 are reactive ion etched (RIE) which removes layer 304 in FIG. 12B and removes layer portions of the layers 302 and 300 beyond the vertical edge 306, forming the first photoresist layer 300 with a vertical edge 308 which is aligned with the vertical edge 306. The vertical edges 306 and 308 are now at an edge site of the second pole tip (P2T) which is to be formed.

Figure 11E:
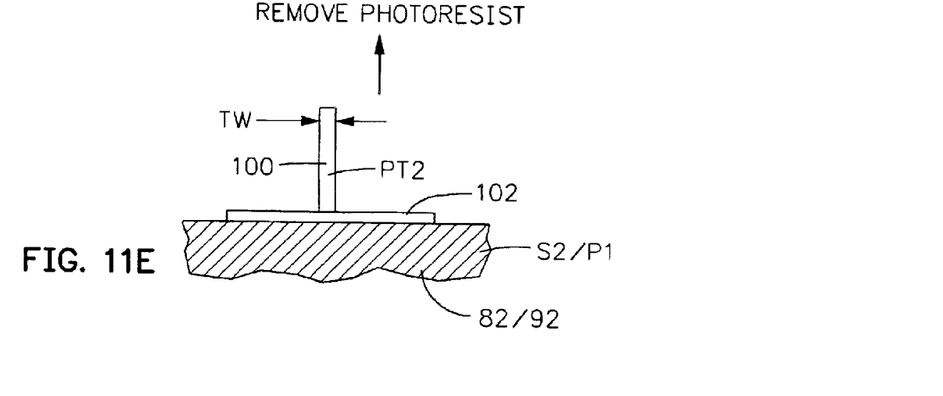
Figure 12D:
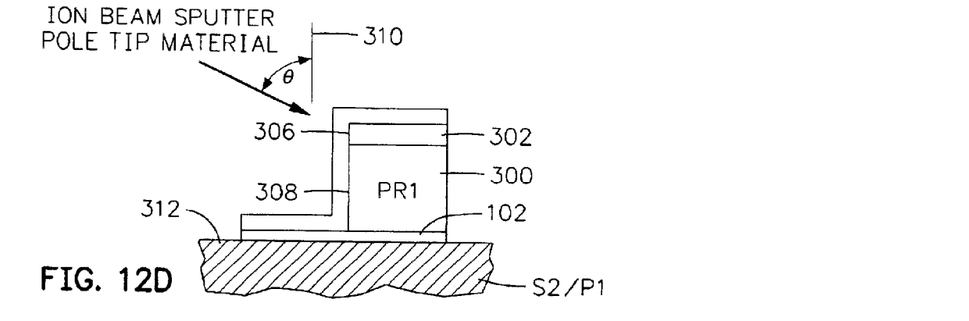
Figure 12E:
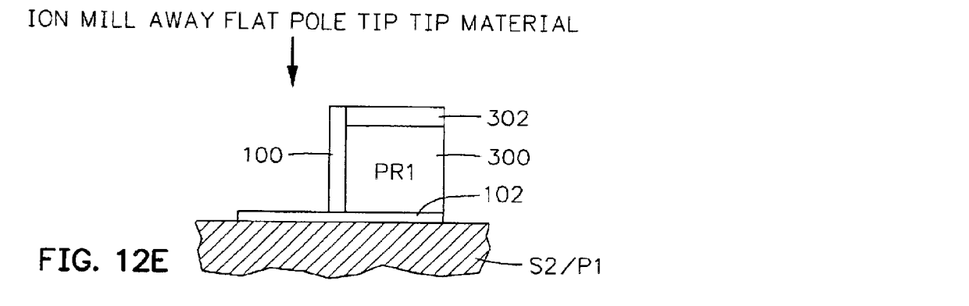
Figure 12F:
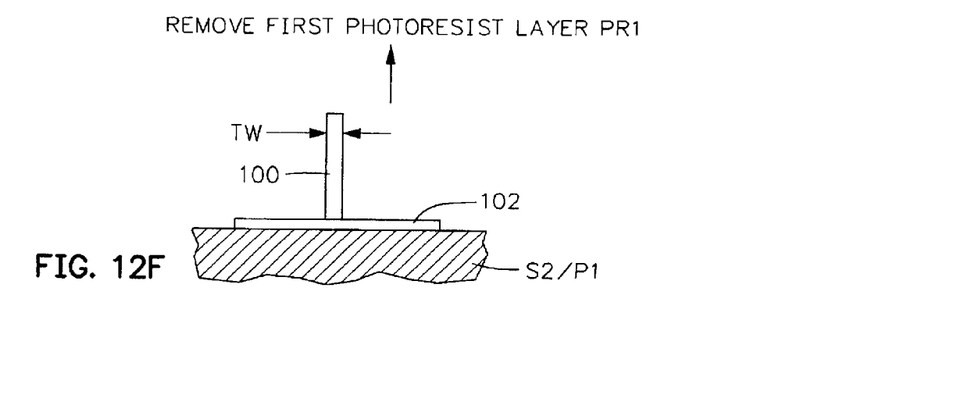

The sequence of steps shown in FIGS. 12D, 12E and 12F are substantially the same as the sequence of steps shown in FIGS. 11C, 11D and 11E, respectively. As shown in FIG. 12D, pole tip material is ion beam sputtered on the top surface of the hard mask 302, the side walls 306 and 308 and the top surface of the write gap layer 102. Again, the ion beam sputtering should be at a maximum angle $\theta$ to a normal 310 to major plane 312 of the write gap layer. In FIG. 12E the horizontal flat surfaces of the pole tip material layer are ion milled away leaving the vertical portion of the pole tip material layer which is the second pole tip (P2T) 100. Again, if desired, the photoresist layer may be removed, as shown in FIG. 12F. If the first pole tip (P1T) 104, as shown in FIGS. 8 and 9, is to be fabricated by this method the underlying structure is the second shield/first pole piece (S2/P1) 82/92, as shown in FIGS. 8 and 9.

Discussion

The height of the pole tip 100 in FIG. 11E is defined by the height of the photoresist layer 200 in FIG. 11A. The height of the pole tip 100 in FIG. 12F is defined by the combined heights of the first photoresist layer 300 and the hard mask layer 302 in FIG. 12A. The track width (TW) of the pole tip 100 in FIG. 11E is defined by the thickness of the pole tip material sputter deposited on the vertical edge 202 in FIG. 11C. In the same manner the track width (TW) of the pole tip 100 in FIG. 12F is defined by the thickness of the pole tip material layer sputter deposited on the vertical edges 306 and 308 in FIG. 12D.

A preferred photoresist is a silicon containing photoresist manufactured by JSR as STL-0214 and by Arch Chemical as PIS-2000. Another resin containing photoresist may be used in lieu thereof. Further, a forming layer other than photoresist may be employed, such as silicon dioxide, which may be patterned by reactive ion etching (RIE) and then, after forming the pole tip, left in place in the read head, if desired, for supporting a very thin pole tip. The invention permits a wide use of pole tip materials such as alloys containing nickel (Ni), iron (Fe) and cobalt (Co). Suitable materials for the pole tip material are nickel iron (NiFe), iron nitride (FeN), iron aluminum nitride (FeAlN) and cobalt iron (CoFe). While not preferred, chemical vapor deposition (CVD) may be employed for forming the pole tip material. Further, other methods may be employed for removing the horizontal portions of the pole tip material such as reactive ion etching (RIE).

When angular ion beam sputtering greater than 45° is employed the thickness of the pole material on the vertical step of the forming layer is greater than the thicknesses of the pole material on the horizontal surfaces. Angular ion beam sputtering is fully described in commonly assigned copending application Ser. No. 09/458,581 filed Dec. 9, 1999 which is incorporated in its entirety by reference herein. Preferred ion beam sputtering angles are within a range from 45° to 90° and even more preferably within a range from 65° to 70°.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic head assembly wherein the magnetic head assembly has a write head with a pole tip comprising the steps of:

forming a shaping layer on an underlying layer wherein the underlying layer has a flat surface and wherein the shaping layer has a side surface and a top surface;

ion beam sputtering a ferromagnetic material layer on the underlying layer and on the side and top surfaces of the shaping layer with the sputtering being directed at an angle to a normal to said flat surface; and removing first and second portions of the ferromagnetic material layer from the underlying layer and the top surface of the shaping layer respectively leaving a remaining portion of the ferromagnetic material layer on the side surface of the shaping layer as said pole tip.

2. A method as claimed in claim 1 wherein said angle is from greater than 45° to 9°.

3. A method as claimed in claim 2 wherein the method further includes removing the shaping layer.

4. A method as claimed in claim 2 further including making a read head including the steps of:

forming nonmagnetic first and second read gap layers;

forming a read sensor between the first and second read gap layers; and forming the first and second read gap layers between a first shield layer and a first pole piece layer.

5. A method as claimed in claim 2 wherein the underlying layer is a write gap layer.

6. A method as claimed in claim 5 including the steps of:

forming a first pole piece layer;

forming the write gap layer on the first piece layer;

forming the pole tip on the write gap layer;

forming an insulation stack with at least one coil layer embedded therein on the first pole piece layer; and forming a second pole piece layer on the insulation stack and stitched to said pole tip.

7. A method as claimed in claim 2 wherein the underlying layer is a first pole piece layer.

8. A method as claimed in claim 7 including the steps of:

forming the pole tip on the first pole piece layer;

forming a write gap layer on the pole tip;

forming an insulation stack with at least one write coil layer embedded therein on the first pole piece layer; and forming a second pole piece layer on the write gap layer and on the insulation stack.

9. A method as claimed in claim 2 wherein the forming of the shaping layer comprises the steps of:

forming a photoresist layer on the underlying layer; and forming the photoresist layer with said side surface wherein the side surface coincides with an edge site of the pole tip.

10. A method as claimed in claim 9 wherein a thickness of the photoresist is the same as a height of the pole tip.

11. A method as claimed in claim 10 wherein the underlying layer is a write gap layer.

12. A method as claimed in claim 11 including the steps of:

forming a first pole piece layer;

forming the write gap layer on the first piece layer;

forming the pole tip on the write gap layer;

forming an insulation stack with at least one coil layer embedded therein on the first pole piece layer; and forming a second pole piece layer on the insulation stack and stitched to said pole tip.

13. A method as claimed in claim 12 wherein the method further includes removing the shaping layer.

14. A method as claimed in claim 12 further including making a read head including the steps of:

forming nonmagnetic first and second read gap layers;

forming a read sensor between the first and second read gap layers; and forming the first and second read gap layers between the first shield layer and the first pole piece layer.

15. A method as claimed in claim 10 wherein the underlying layer is a first pole piece layer.

16. A method as claimed in claim 15 including the steps of:

forming the pole tip on the first pole piece layer;

forming a write gap layer on the pole tip;

forming an insulation stack with at least one write coil layer embedded therein on the first pole piece layer; and forming a second pole piece layer on the write gap layer and on the insulation stack.

17. A method as claimed in claim 16 wherein the method further includes removing the shaping layer.

18. A method as claimed in claim 16 further including making a read head including the steps of:

forming nonmagnetic first and second read gap layers;

forming a read sensor between the first and second read gap layers; and forming the first and second read gap layers between the first shield layer and the first pole piece layer.

19. A method as claimed in claim 2 wherein said angle is from 65° to 70°.

20. A method as claimed in claim 19 wherein said angle is 70°.

21. A method of making a magnetic head assembly wherein the magnetic head assembly has a write head with a pole tip comprising the steps of:

forming a shaping layer on an underlying layer wherein the underlying layer has a flat surface and wherein the shaping layer has a side surface and a top surface;

depositing a ferromagnetic material layer on the underlying layer and on the side and top surfaces of the shaping layer by ion beam sputtering the ferromagnetic material at an angle to a normal to said flat surface; and removing first and second portions of the ferromagnetic material layer from the underlying layer and the top surface of the shaping layer respectively leaving a remaining portion of the ferromagnetic material layer on the side surface of the shaping layer as said pole tip;

said forming of the shaping layer comprising the steps of:
forming a first photoresist layer on the underlying layer wherein the first photoresist layer has a thickness;
forming a masking layer on the first photoresist layer;
forming a second photoresist layer on the masking layer with a thickness that is less than the thickness of the first photoresist layer;
forming the second photoresist layer with an edge which coincides with an edge site of said pole tip; and
reactive ion etching the masking layer and the first photoresist layer to form the masking layer and the first photoresist layer with said side surface for forming an edge of said pole tip.

22. A method as claimed in claim 21 wherein a material of the mask is selected from the group consisting of silicon dioxide, silicon nitride, silicon oxynitride, tantalum oxide and titanium dioxide.

23. A method as claimed in claim 21 wherein the forming of the shaping layer further includes removing the second photoresist layer.

24. A method as claimed in claim 21 wherein a total of thicknesses of the first photoresist and the masking layer equals a height of the pole tip.

25. A method as claimed in claim 24 wherein the underlying layer is a write gap layer.

26. A method as claimed in claim 25 including the steps of:
forming a first pole piece layer;
forming the write gap layer on the first piece layer;
forming the pole tip on the write gap layer;
forming an insulation stack with at least one coil layer embedded therein on the first pole piece layer; and
forming a second pole piece layer on the insulation stack and stitched to said pole tip.

27. A method as claimed in claim 26 wherein removing the shaping layer after leaving a remaining portion of the ferromagnetic material layer on the side surface of the shaping layer as said pole tip.

28. A method as claimed in claim 27 further including making a read head including the steps of:
forming nonmagnetic first and second read gap layers;
forming a read sensor between the first and second read gap layers; and
forming the first and second read gap layers between the first shield layer and the first pole piece layer.

29. A method as claimed in claim 24 wherein the underlying layer is a first pole piece layer.

30. A method as claimed in claim 29 including the steps of:
forming the pole tip on the first pole piece layer;
forming a write gap layer on the pole tip;
forming an insulation stack with at least one write coil layer embedded therein on the first pole piece layer; and
forming a second pole piece layer on the write gap layer and on the insulation stack.

31. A method as claimed in claim 30 wherein the forming of the shaping layer further includes:
removing the second photoresist layer; and
removing the shaping layer.

32. A method as claimed in claim 31 further including making a read head including the steps of:
forming nonmagnetic first and second read gap layers;
forming a read sensor between the first and second read gap layers; and
forming the first and second read gap layers between the first shield layer and the first pole piece layer.

33. A method as claimed in claim 2 wherein said side surface is the only side surface of the shaping layer that shapes the pole tip with the shaping layer commencing at said flat surface of the underlying layer and extends upwardly therefrom in a direction normal thereto.

34. A method of making a magnetic head assembly wherein the magnetic head assembly has a write head with a pole tip comprising the steps of:
forming a shaping layer on an underlying layer wherein the underlying layer has a flat surface and wherein the shaping layer has a side surface and a top surface;
sputter depositing a ferromagnetic material layer on the underlying layer and on the side and top surfaces of the shaping layer wherein said sputter depositing is ion beam sputtering at an angle to a normal to said flat surface; and
removing first and second portions of the ferromagnetic material layer from the underlying layer and the top surface of the shaping layer respectively leaving a remaining portion of the ferromagnetic material layer on the side surface of the shaping layer as said pole tip.

35. A method as claimed in claim 34 wherein the forming of the shaping layer comprises the steps of:
forming a photoresist layer on the underlying layer; and
forming the photoresist layer with said side surface wherein the side surface coincides with an edge site of the pole tip.

36. A method as claimed in claim 35 wherein the method further includes removing the shaping layer after leaving a remaining portion of the ferromagnetic material layer on the side surface of the shaping layer as said pole tip.

37. A method as claimed in claim 36 wherein said angle is from greater than 45° to 90°.

38. A method as claimed in claim 37 further including making a read head including the steps of:
forming nonmagnetic first and second read gap layers;
forming a read sensor between the first and second read gap layers; and
forming the first and second read gap layers between a first shield layer and a first pole piece layer.

* * * * *

UNITED STATES PATENT AND TRADEMARK OFFICE
CERTIFICATE OF CORRECTION

PATENT NO. : 6,862,798 B2
DATED : March 8, 2005
INVENTOR(S) : Kruger et al.

It is certified that error appears in the above-identified patent and that said Letters Patent is hereby corrected as shown below:

Column 7,
Line 33, change "9°" to -- 90° --

Signed and Sealed this

Twenty-fourth Day of May, 2005

JON W. DUDAS
*Director of the United States Patent and Trademark Office*